(12) United States Patent
Miyachi

(10) Patent No.: US 8,602,147 B2
(45) Date of Patent: Dec. 10, 2013

(54) CONSTRUCTION MACHINE

(75) Inventor: Isao Miyachi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 451 days.

(21) Appl. No.: 12/537,610

(22) Filed: Aug. 7, 2009

(65) Prior Publication Data

US 2010/0071986 A1    Mar. 25, 2010

(30) Foreign Application Priority Data

Sep. 19, 2008   (JP) ................................. 2008-241024

(51) Int. Cl.
  *B62D 25/10*   (2006.01)
  *B60K 15/067*   (2006.01)
  *B60K 15/073*   (2006.01)

(52) U.S. Cl.
  USPC .......................... 180/69.4; 180/69.2; 280/834

(58) Field of Classification Search
  USPC ............. 180/69.2, 69.4, 89.1, 89.14; 280/834
  See application file for complete search history.

(56) References Cited

U.S. PATENT DOCUMENTS

| | | | | |
|---|---|---|---|---|
| 3,583,518 A | * | 6/1971 | Bichel et al. ................ | 180/89.1 |
| 4,268,048 A | | 5/1981 | Teraoka et al. | |
| 4,457,525 A | * | 7/1984 | Tanaka et al. ................ | 280/834 |
| 4,487,283 A | * | 12/1984 | Suzuki et al. ................ | 180/219 |
| 4,506,754 A | * | 3/1985 | Hirano et al. ................ | 180/219 |
| 4,577,719 A | * | 3/1986 | Nomura et al. ............... | 180/219 |
| 5,374,106 A | * | 12/1994 | Hoefer ......................... | 297/236 |
| 6,491,180 B2 | * | 12/2002 | Distelhoff et al. ........... | 220/562 |
| 6,543,426 B1 | * | 4/2003 | Schwochert ................. | 123/516 |
| 2004/0200356 A1 | | 10/2004 | Kuperus | |

FOREIGN PATENT DOCUMENTS

| | | |
|---|---|---|
| GB | 2 166 093 A | 4/1986 |
| JP | 2-148831 | 12/1990 |
| JP | 8-58451 | 3/1996 |
| JP | 9-88122 | 3/1997 |
| JP | 11-81381 | 3/1999 |
| JP | 2006-282048 | 10/2006 |

OTHER PUBLICATIONS

Extended Search Report issued Nov. 3, 2010 in EP Application No. 09168034.8.

* cited by examiner

*Primary Examiner* — Frank Vanaman
(74) *Attorney, Agent, or Firm* — Oblon, Spivak, McClelland, Maier & Neustadt, L.L.P.

(57) ABSTRACT

In a compact excavator of the type wherein an opening portion of an engine room with a fuel tank installed therein is opened and closed with a bonnet and an operator's seat is provided on the bonnet, a load transfer member is provided on an upper surface of the fuel tank in a state in which a load receiving portion is in contact with the bonnet, so that a total load comprising the weight of the operator's seat, the weight of an operator sitting on the operator's seat and the weight of the bonnet is transmitted from the bonnet to the fuel tank as a force of pressing down the tank from above.

10 Claims, 7 Drawing Sheets

CONSTRUCTION MACHINE

BACKGROUND OF THE INVENTION

1. Field of the Invention

The present invention relates to a construction machine wherein a tank accommodating space with a fuel tank accommodated therein is covered with a bonnet from above and wherein an operator's seat is provided on the bonnet.

2. Description of the Related Art

With a small-sized hydraulic excavator (compact excavator) as an example, which is a suitable example of the present invention, a description will be given below about the background art.

In a compact excavator, as shown in FIGS. 6 and 7, an upper rotating body 2 is mounted rotatably on a crawler type lower traveling body 1 and a working attachment 9 comprising a boom 3, an arm 4, a bucket 5 and hydraulic cylinders (boom cylinder, arm cylinder, bucket cylinder) 6 to 8 for actuating those boom, arm and bucket respectively are attached to the upper rotating body 2.

An engine room 13 (a tank accommodating space recited in claim 1), which is enclosed with right and left side panels (only one-side panel is shown) 11 and a bonnet 12, is provided at a rear portion of an upper frame 10 constituting the upper rotating body 2. A fuel tank 14 is accommodated within the engine room 13 together with devices, including an engine (not shown).

The bonnet 12 is formed in L shape which covers both upper surface side and rear surface side of the engine room 13. The bonnet 12 is secured to the upper frame 10 through a support member (not shown) in a state in which it turns on a bonnet shaft (hinge) 15 disposed at a front end portion of the bonnet to open and close both upper and rear surface opening portions.

FIG. 6 shows a state with the bonnet 12 closed, while FIG. 7 shows a state with the bonnet 12 opened. Maintenance of the devices is conducted in an opened state of the bonnet.

An operator's seat 16 and operating levers (only one is shown in FIG. 6) 17 are installed on the bonnet 12 and an operator O operates the levers while sitting on the operator's seat 16 as shown in FIG. 6.

In the drawings, the numeral 18 denotes a rear frame provided at a rear end of the upper frame and serving also as a counterweight.

In this conventional compact excavator, the fuel tank 14 is secured to the upper frame 10 through brackets by fastening means at a plurality of positions in the vertical direction such as, for example, upper and intermediate positions (see Japanese Utility Model Laid-Open Publication No. Hei 2 (1990)-148831).

However, according to the related art wherein the fuel tank 14 is fixed with only the fixing force of fastening means, it is necessary to fix the tank at plural positions and a bracket is needed at each fixing portion. As a result, not only the tank mounting structure becomes complicated, but also the tank mounting work is troublesome.

According to the related art, moreover, the tank fixing portions are specified, so particularly in the case of a plastic fuel tank, the tank mounting work becomes more troublesome due to dimensional variations and deformations. Further, there also has been the problem that the fastening means are apt to become loose.

SUMMARY OF THE INVENTION

It is an object of the present invention to provide a construction machine capable of simplifying the tank mounting structure, also capable of minimizing the number of fuel tank fixing portions and further capable of fixing the fuel tank in a highly stable manner.

According to the present invention there is provided a construction machine wherein at least an upper surface opening portion of a tank accommodating space with a fuel tank accommodated therein is adapted to be opened and closed by a bonnet and wherein an operator's seat is provided on the bonnet, the construction machine comprising a load transfer member for transmitting a load imposed on the bonnet to the fuel tank as a force of pressing the tank from above.

According to the present invention, a load acting on the bonnet, i.e., a total load comprising the weight of the operator's seat, the weight of the operator sitting on the operator's seat and the weight of the bonnet, is transmitted from the bonnet to the fuel tank via the load transfer member as a force of pressing the tank from above. With this pressing force, it is possible to fix the fuel tank.

Thus, because the number of other fixing portions using fastening means can be minimized, as compared with the related art, it is possible to greatly simplify the tank mounting structure and thereby simplify the tank mounting work to a remarkable extent.

Besides, the aforesaid pressing force acts on the tank surely even under dimensional variations or deformations as is the case with a plastic tank, thus ensuring a constant tank fixing force. Accordingly, the tank can be fixed in a stable state.

In the above structure, it is preferable that the bonnet be mounted so as to turn on one end side in the longitudinal direction thereof, thereby to be adopted to open and close the tank accommodating space, and that the fuel tank and the load transfer member be installed on the side opposite to the opening/closing center of the bonnet.

In this case, due to a turning moment acting on the bonnet, a load can be utilized particularly effectively as a tank pressing force (fixing force), so that the tank can be fixed in a more stable manner.

In any of the above structures, it is preferable that the load transfer member be provided with an upwardly projecting load receiving portion, and be mounted to an upper surface of the fuel tank in a state in which the load receiving portion is in contact with a lower surface of the bonnet and receives the load directly.

In this case, since the load receiving portion of the load transfer member is brought into contact with the lower surface of the bonnet to receive the load directly, any load acting on the bonnet can be transmitted to the fuel tank directly without waste.

In any of the above structures, a tank inserting portion for insertion therein of a lower portion of the fuel tank and for restraining the lower portion of the fuel tank from both front and rear sides may be formed in the tank accommodating space.

In this structure, a tank pad made of rubber may be further provided on at least one of a front face side and a rear face side of the tank inserting portion.

In this case, the lower portion of the fuel tank can be restrained in the longitudinal direction by merely inserting the tank lower portion into the tank inserting portion formed in the tank accommodating space, so that the number of fixing portions using fastening means is further reduced and hence the tank mounting work becomes still easier.

Moreover, with both downward pressing force and this restraining force, the tank can be held in a more stable manner.

Particularly, since the tank can be restrained more surely by the tank pad made of rubber, it is possible to strengthen the fixed state of the tank.

In any of the above structures, it is preferable that a vibration isolating plate made of rubber be disposed between a lower surface of the fuel tank and a tank supporting surface for supporting the fuel tank from below.

In this structure, it is preferable that a drain plate having a drain port be provided on the lower surface of the fuel tank and that a drain plate fitting hole for fitting therein of the drain plate be formed in the vibration isolating plate.

In this case, since the vibration isolating plate made of rubber is disposed between the lower surface of the tank and the tank supporting surface, not only the vibration of the tank can be suppressed effectively with both downward pressing force and the vibration isolating plate, but also the fuel tank can be pressed down more strongly with a repulsive force of the vibration isolating plate.

Further, since motion of the lower portion of the tank can be suppressed by utilizing the drain plate provided on the lower surface of the fuel tank, it is possible to further stabilize the fixed state of the tank.

DESCRIPTION OF THE PREFERRED EMBODIMENTS

An embodiment of the present invention will be described below with reference to FIGS. 1 to 5.

In this embodiment the present invention is applied to a compact excavator according to the foregoing description of the background art.

Figure 1:
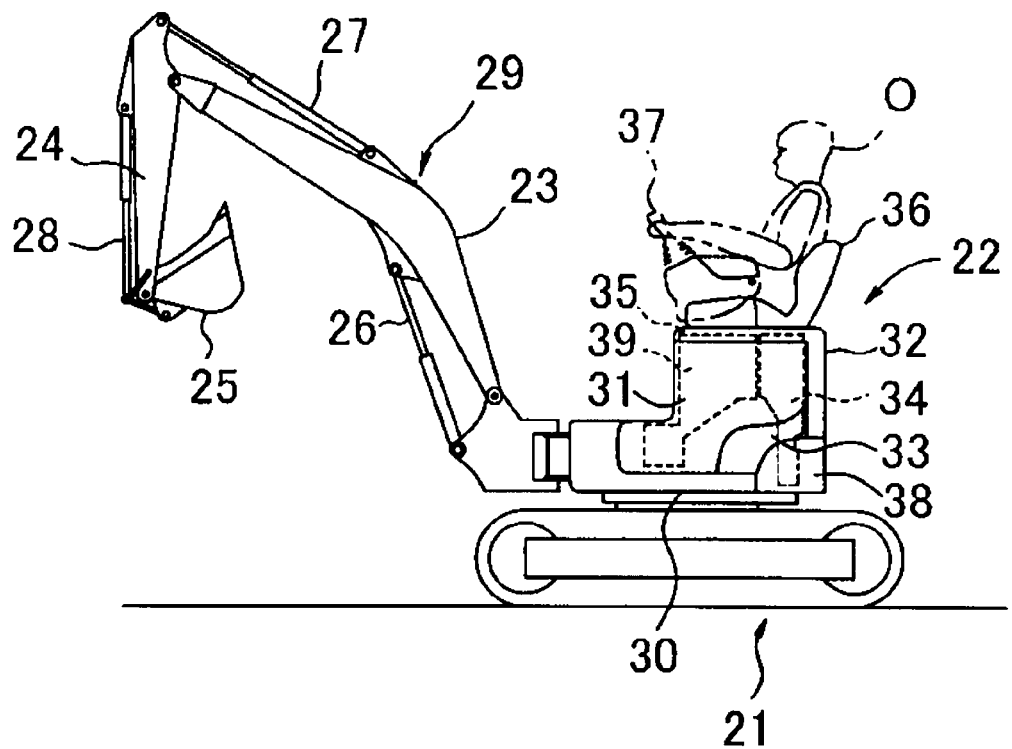
FIG. 1 is a schematic side view of a compact excavator according to an embodiment of the present invention.
Figure 2:
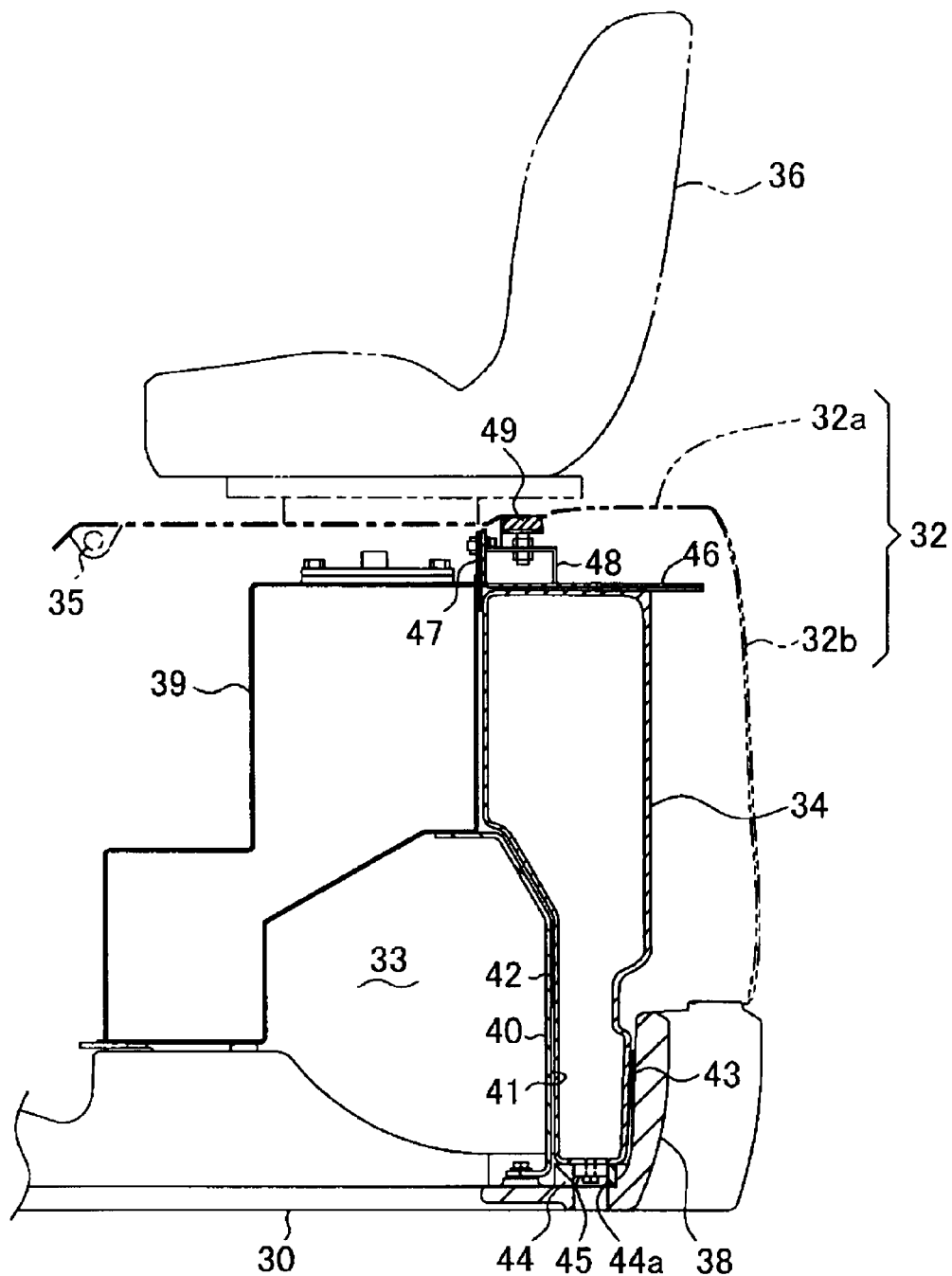
FIG. 2 is a partial enlarged sectional view thereof.
Figure 3:
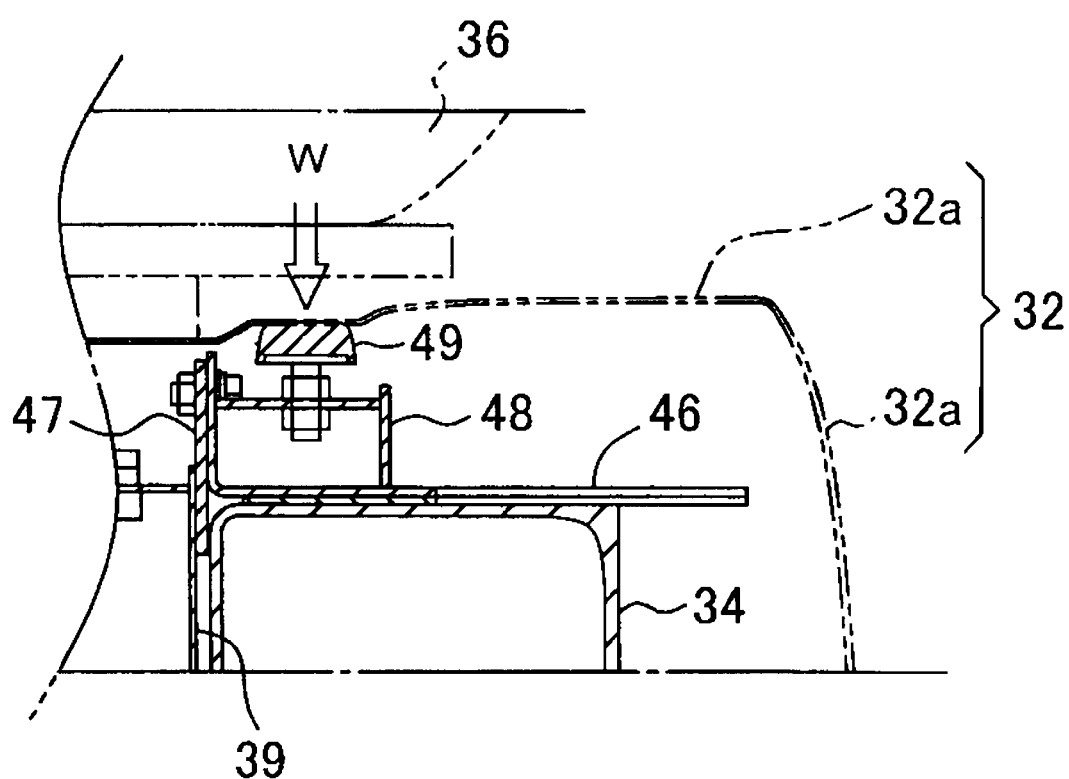
FIG. 3 is an enlarged view of an upper portion of FIG. 2.
Figure 4:
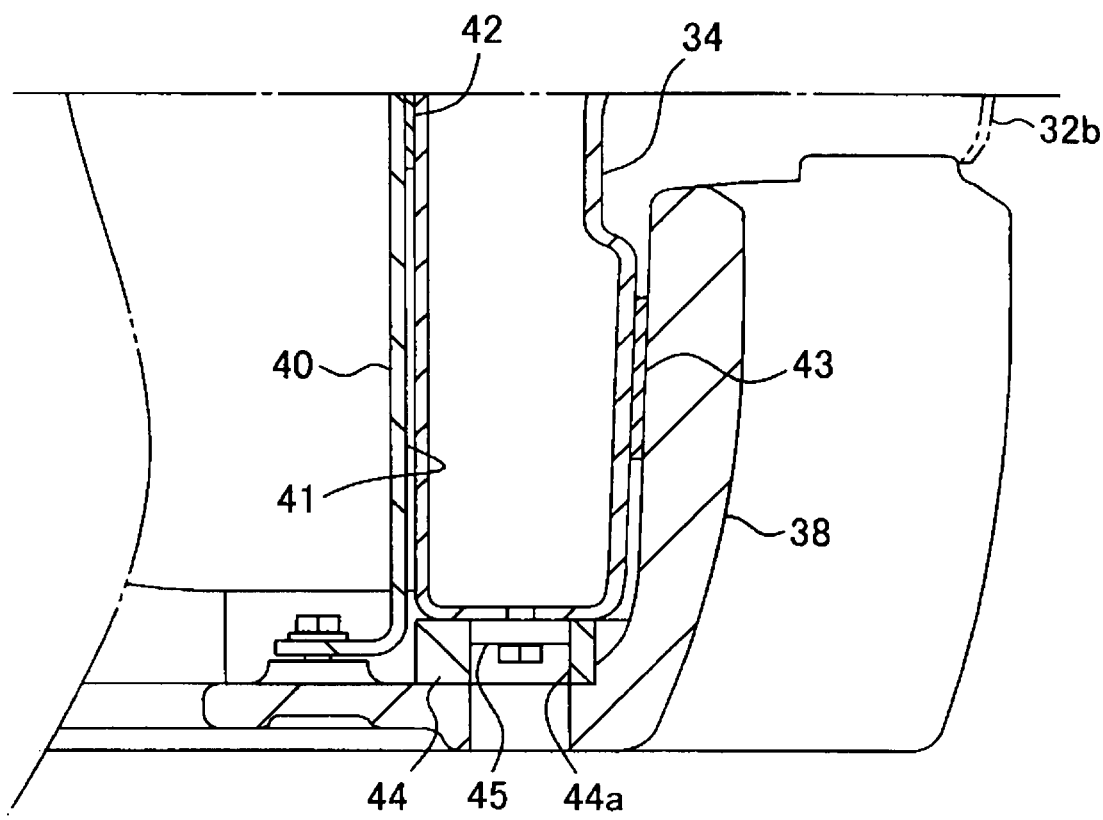
FIG. 4 is an enlarged view of a lower portion of FIG. 2.
Figure 5:
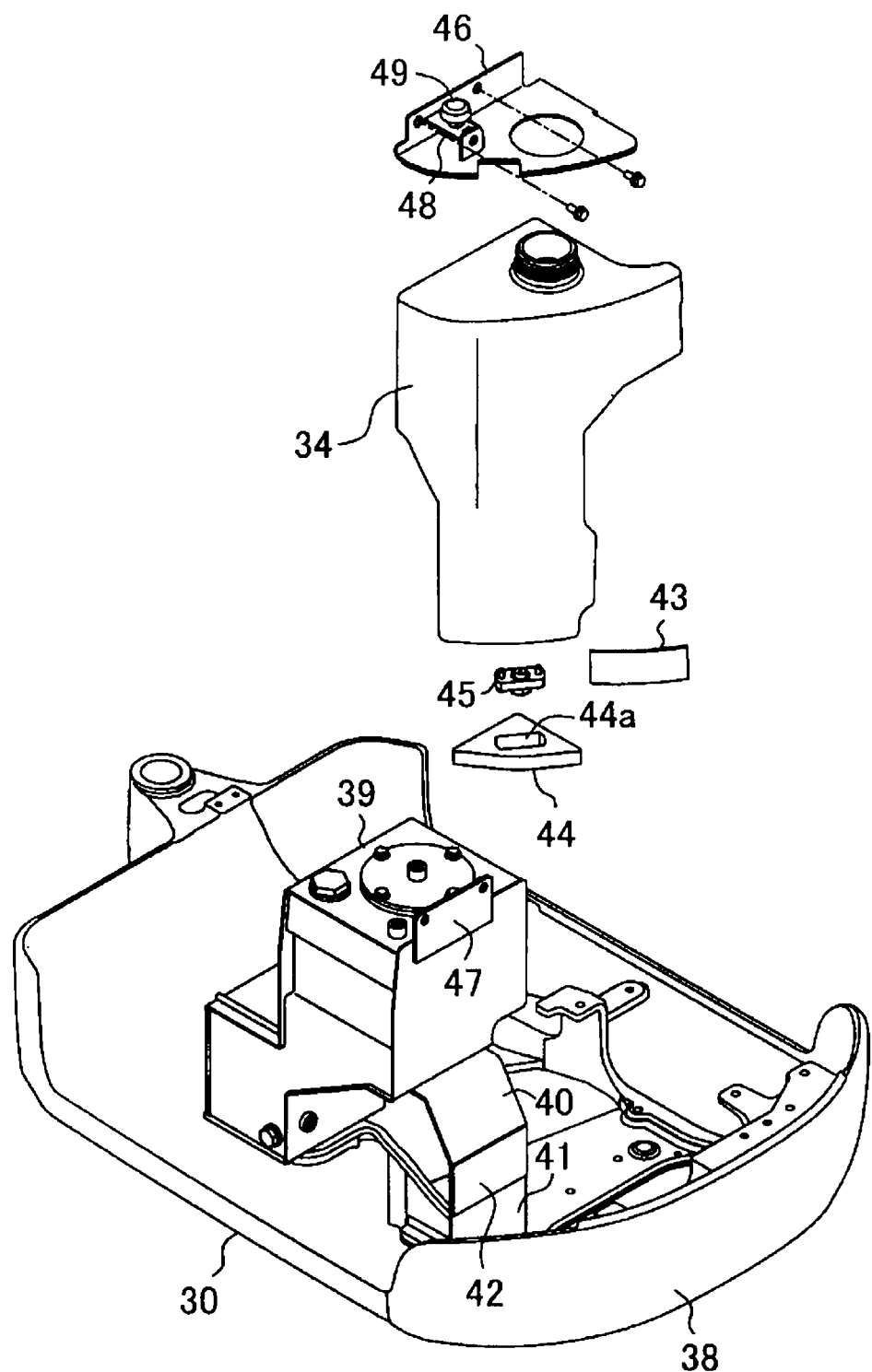
FIG. 5 is a perspective view of an upper frame and a fuel tank in the compact excavator.

FIG. 1 shows a schematic structure of an entire compact excavator as seen from a side face thereof.

Figure 6:
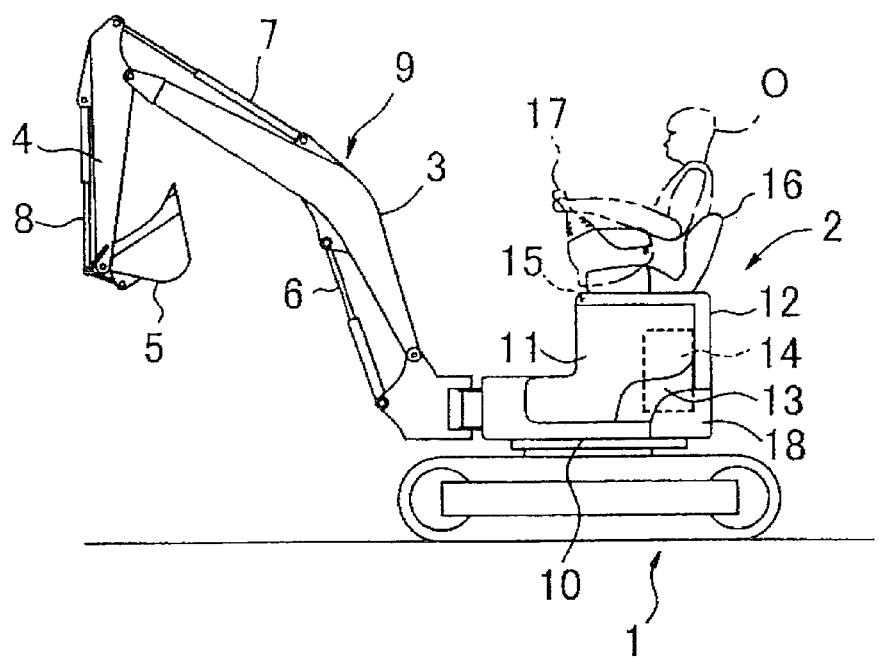
FIG. 6 is a schematic side view of a conventional compact excavator.
Figure 7:
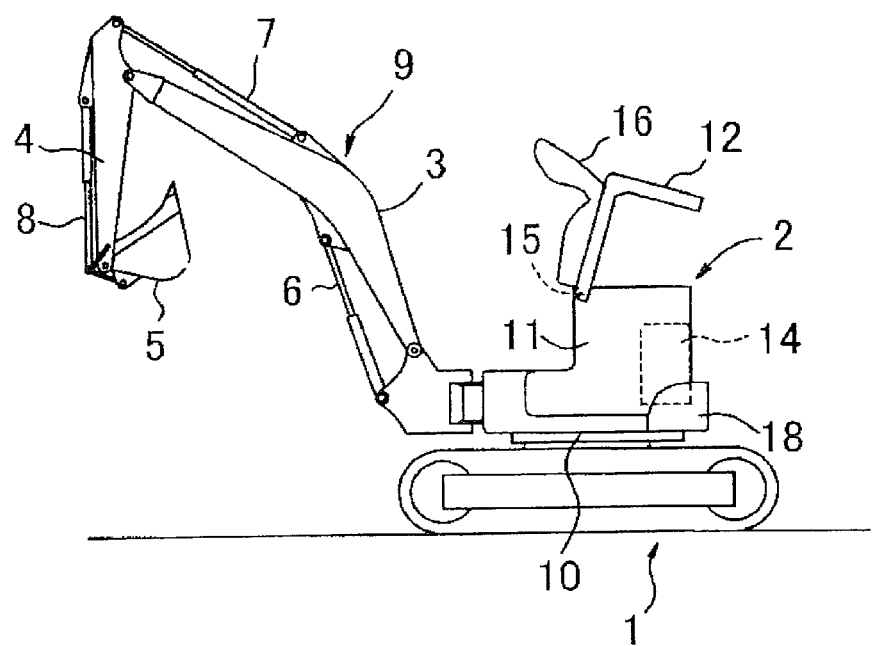
FIG. 7 is a diagram corresponding to FIG. 6, with a bonnet of the compact excavator opened.

In this embodiment the following points are the same as in the compact excavator shown in FIGS. 6 and 7.

(i) In the compact excavator, an upper rotating body 22 is mounted rotatably on a crawler type lower traveling body 21 and working attachments 29 comprising a boom 23, an arm 24, a bucket 25 and hydraulic cylinders (boom cylinder, arm cylinder, bucket cylinder) 26-28 for actuating the boom, arm and bucket respectively are attached to the upper rotating body 22.

(ii) An engine room 33 (a tank accommodating space recited in claims), which is enclosed with right and left side panels (only one-side panel is shown) 31 and a bonnet 32, is provided at a rear portion of an upper frame 30 constituting the upper rotating body 22. A fuel tank 34 is accommodated within the engine room 33 together with devices, including an engine (not shown).

(iii) The bonnet 32 is formed in L shape which covers both upper surface side and rear surface side of the engine room 33. The bonnet 32 is secured to the upper frame 30 through a support member (not shown) in a state in which it turns on a bonnet shaft (hinge) 35 disposed at a front end portion of the bonnet to open and close both upper and rear surface opening portions.

In FIG. 1, the numeral 37 denotes an operating lever provided on the bonnet 12 and near an operator's seat 36, numeral 38 denotes a rear frame of a generally L-shaped section, the rear frame 38 being provided at a rear end of the upper frame and serving also as a counterweight, and numeral 39 denotes a working oil tank disposed within the engine room 33, the working oil tank 39 being close to the front part of the fuel tank 34.

The fuel tank 34 is formed in a vertically long shape using a plastic material and it is installed at a rear part of the engine room by a tank mounting structure shown in FIGS. 2 to 5.

I) In front of the fuel tank 34, a tank supporting plate 40 is disposed vertically on the upper frame 30 and a lower portion of the fuel tank 34 is inserted into a tank inserting portion 41 which is a space formed between the tank supporting plate 40 and the rear frame 38.

A longitudinal dimension of the tank inserting portion 41 is set almost equal to (somewhat larger than) that of the lower portion of the fuel tank 34 so that the lower portion of the fuel tank is inserted into the tank inserting portion 41 to be restrained in the longitudinal direction.

II) Tank pads 42 and 43 made of rubber are provided on a front face side (the tank supporting plate 40) and a rear face side (the rear frame 38) respectively of the tank inserting portion 41. The pads 42 and 43 are put in elastic contact with front and rear faces respectively of the tank.

III) A vibration isolating plate 44 made of rubber is disposed between a lower surface of the fuel tank 34 and a tank supporting surface (a horizontal surface of the rear frame 38). With the vibration isolating plate 44, the fuel tank 34 is supported in a vibration-isolated state from below.

IV) A thick drain plate 45 having a drain port is provided on the lower surface of the fuel tank 34 so as to project, and a drain plate fitting hole 44a (see FIGS. 4 and 5) of substantially the same shape and size as the drain plate 45 is formed in the vibration isolating plate 44, and the drain plate 45 is fitted in the drain plate fitting hole 44a.

V) A mounting plate 46 is secured to an upper surface of the fuel tank 34 and a vertical receiving plate 47 is secured to an upper end portion of a rear wall of the working oil tank 39, confronting vertical surfaces of both plates 46 and 47 being screwed to each other, whereby an upper portion of the fuel tank 34 is fixed.

VI) As the most characteristic point in structure, a plate-like load transfer member 48 is secured to the mounting plate 46.

A load receiving portion 49 made of rubber is provided upwards on the load transfer member 48 so as to project and the load receiving portion 49 is in contact with a lower surface of the bonnet.

More specifically, the bonnet 32 comprises an upper surface portion 32a with the operator's seat 36 installed thereon, the upper surface portion 32a being adapted to open and close the upper surface opening portion of the engine room 33, and a rear surface portion 32b adapted to open and close the rear surface opening portion of the engine room. The load receiving portion 49 is in contact with the upper surface portion 32a of the bonnet 32.

It is preferable that the load receiving portion 49 be made of rubber for making its contact with the upper surface portion 32a of the bonnet more surely and for softening the contact thereof against the upper surface portion 32a of the bonnet. However, it may be made of metal.

According to this structure, a load acting on the bonnet 32 from the operator's seat 36, i.e., a total load (W in FIG. 3) comprising the weight of the operator's seat 36, the weight of an operator O setting on the operator's seat, and the weight of the bonnet, is transmitted from the bonnet 32 to the fuel tank 34 via the load transfer member 48 as a force of pressing down the fuel tank 34.

With this pressing force, the fuel tank 34 can be fixed to the upper frame 30.

Thus, because the number of other fixing portions using fastening means can be minimized (in this embodiment only one upper screwed portion through the mounting plate 46 and the receiving plate 47), as compared with the related art, it is possible to greatly simplify the tank mounting structure and thereby simplify the tank mounting work to a remarkable extent Moreover, the aforesaid pressing force is exerted surely on the fuel tank even if there are dimensional variations and deformations like the plastic tank illustrated in this embodiment, ensuring a constant tank fixing force, whereby the tank can be fixed in a stable state.

Further, according to this embodiment there accrue the following advantages.

(A) Because of the structure such that the bonnet 32 turns on its front end side to open or close the engine room 33, the load W can be effectively utilized particularly as the tank pressing force (fixing force) under the turning moment acting on the bonnet 32. Consequently, the tank can be fixed in a more stabilized state.

The bonnet 32 may be of a plate-like shape (constituted by only the upper surface portion 32a in this embodiment) which opens and closes only the upper surface opening portion of the engine room 33.

(B) Because of the structure such that the load receiving portion 49 of the load transfer member 48 is brought into contact with the lower surface of the bonnet to receive the load directly, all the load acting on the bonnet 32 can be transmitted directly to the fuel tank 34 without waste.

(C) Since the lower portion of the fuel tank 34 can be restrained in the longitudinal direction by only inserting it into the tank inserting portion 41 formed at the lower portion of the engine room, the portion to be fixed by fastening means is further reduced and hence the mounting work for the fuel tank 34 becomes still easier.

(D) With the restraining force in the tank inserting portion 41 and the downward load W, the fuel tank 34 can be held in a more stable manner.

(E) Since the fuel tank 34 can be restrained more surely by both front- and rear-side tank pads 42 and 43 made of rubber, it is possible to strengthen the fixed state of the tank. Such a tank pad may be provided on only one of the front and rear sides.

(F) Since the vibration isolating plate 44 made of rubber is disposed between the lower surface of the fuel tank and the tank supporting surface (rear frame 38), not only vibration of the fuel tank 34 can be suppressed by both downward pressing force and the vibration isolating plate 44, but also the fuel tank 34 can be pressed own more strongly with the repulsive force of the vibration isolating plate 44.

(G) Since motion of the lower portion of the fuel tank can be suppressed by utilizing the drain plate 45 provided on the lower surface of the fuel tank, the fixed state of the tank can be more stabilized.

Other Embodiments (1) Although in the above embodiment reference has been made as an example to the construction machine wherein the fuel tank 34 is installed within the engine room 33 with the engine accommodated therein, the engine room 33 being opened and closed with the bonnet 32, and the operator's seat 36 is provided on the bonnet 32, the present invention is also applicable in the same way as above to a construction machine wherein an engine room, a tank accommodating space, a bonnet for opening and closing the engine room, and a bonnet for opening and closing the tank accommodating space are provided, and an operator's seat is provided on the bonnet for opening and closing the tank accommodating space.

(2) Although the present invention is suitable for a construction machine of the type wherein the bonnet 32 turns as in the above embodiment, the present invention is also applicable to a construction machine of the type wherein the bonnet slides.

(3) The present invention is applicable not only to a small-sized hydraulic excavator (compact excavator), but also to any of excavators wherein an operator's seat is provided on the bonnet for opening and closing the tank accommodating space, as well as other construction machines (e.g., crushers) than excavators.

Although the invention has been described with reference to the preferred embodiments in the attached figures, it is noted that equivalents may be employed and substitutions made herein without departing from the scope of the invention as recited in the claims.

I claim:

1. A construction machine comprising:
a fuel tank;
a bonnet adapted to open and close at least an upper surface opening portion of a tank accommodating space with said fuel tank accommodated therein;
an operator's seat provided on said bonnet;
a tank inserting portion that restrains a lower portion of said fuel tank from both front and rear sides via contact of the front side of the lower portion of the fuel tank with a front wall of the tank inserting portion and contact of the rear side of the lower portion of the fuel tank with a rear wall of the tank inserting portion, by allowing the lower portion of said fuel tank to be inserted into the tank inserting portion from above, the tank inserting portion being a space formed between the front wall and the rear wall facing each other in a front-and-rear direction in said tank accommodating space; and
a load transfer member that transmits a load acting on said bonnet to said fuel tank as a force of pressing down said fuel tank from above to into the tank inserting portion.

2. The construction machine according to claim 1, wherein said bonnet is mounted so as to turn on one end side in a longitudinal direction thereof, thereby to be adapted to open and close said tank accommodating space, and said fuel tank and said load transfer member being installed on a side opposite to the one end side of said bonnet.

3. The construction machine according to claim 1, wherein said load transfer member includes an upwardly projecting load receiving portion, and is mounted to an upper surface of said fuel tank in a state in which said load receiving portion is in contact with a lower surface of said bonnet and receives the load directly.

4. The construction machine according to claim 1, wherein at least one of the front wall and the rear wall of the tank inserting portion is in indirect contact with the lower portion of the fuel tank via a tank pad made of rubber.

5. The construction machine according to claim 1, wherein a vibration isolating plate made of rubber is disposed between a lower surface of said fuel tank and a tank supporting surface for supporting said fuel tank from below.

6. The construction machine according to claim 5, wherein a drain plate having a drain port is provided on the lower surface of said fuel tank and a drain plate fitting hole for fitting therein of said drain plate is formed in said vibration isolating plate.

7. A construction machine comprising:
a fuel tank;
a mounting plate secured to an upper surface of the fuel tank;
a tank accommodating space in which the fuel tank is disposed;
a bonnet that covers an upper surface portion of the tank accommodating space;
a seat disposed on the bonnet;
a tank inserting portion that restrains a lower portion of said fuel tank from both front and rear sides by allowing the lower portion of said fuel tank to be inserted into the tank inserting portion from above, the tank inserting portion being a space formed between a front wall and a rear wall facing each other in a front-and-rear direction in said tank accommodating space; and
a load transfer member secured to the mounting plate,
wherein a load acting on the bonnet is transferred to the fuel tank via the load transfer member so as to press down on the fuel tank into the tank inserting portion and restrain the fuel tank in the tank accommodating space.

8. The construction machine according to claim 7, wherein the bonnet includes a first end and an opposing second end, the bonnet being secured to the machine via a bonnet shaft hinge disposed on the first end of the bonnet, the bonnet pivoting on the hinge to cover or uncover the fuel tank accommodating space, and the second end of the bonnet being disposed so as to contact the load transfer member, whereby the load is transferred through the second end of the bonnet opposite the hinge directly to the load transfer member.

9. The construction machine according to claim 7, wherein the load transfer member includes a load receiving portion that abuts the bonnet when the bonnet is pivoted into a closed position, and
wherein the load receiving portion is disposed between the bonnet and the mounting plate on which the load transfer member is secured.

10. The construction machine according to claim 9, wherein the load receiving portion includes at least one of rubber and metal.

* * * * *